STORAGE CIRCUIT UTILIZING DIFFERENTIAL AMPLIFIER STAGES

Filed Dec. 1, 1966

WITNESSES:
Bernard R. Giegney
James F. Young

INVENTORS
Edward Hands and
Graham Henstock.
BY
ATTORNEY 3,469,112
STORAGE CIRCUIT UTILIZING DIFFERENTIAL AMPLIFIER STAGES

Edward Hands, Fairport, and Graham Henstock, Rochester, N.Y., assignors to Canadian Westinghouse Company, Limited, Hamilton, Ontario, Canada Filed Dec. 1, 1966, Ser. No. 598,462
Int. Cl. H03k *5/18, 5/20*
U.S. Cl. 307—238 7 Claims The present invention relates to storage circuits and, more particularly, to storage circuits for storing a signal level over extended periods of time.

In many control systems applications it is necessary to store a signal level for long periods of time. This long storage capability is highly desirable in automatic frequency control and automatic gain control circuitry. Such a storage circuit also finds use as a signal memory device for extending the display times in information display apparatus. The principal requirement of the storage circuit is that it be capable of acquiring the desired storage level and then holding this storage level without substantial attenuation over the desired storage time. It is also necessary that the inputted signal to be stored be accurately translated to the storage element of the circuit with a minimum of error therebetween. Moreover, it is highly desirable that the circuit be capable of acquiring different storage levels in response to newly inputted information and maintain this level in the presence of external circuit variations.

It is therefore an object of the present invention to provide a new and improved storage circuit.

It is a further object of the present invention to provide a new and improved storage circuit capable of maintaining a desired storage level over extended periods of time.

It is still a further object to provide a new and improved storage circuit for storing a desired signal level in response to input information at that level and for holding this level over long periods of time.

In general, the storage circuit of the present invention utilizes a differential amplifier arrangement in which the desired storage level is established at one input thereto, while a storage element at another input thereto acquires the desired storage level. The storage circuit is selectively operative to accept and store desired level at the storage element and then, in a different mode of operation, is operative to maintain the desired store level over extended periods of time.

Figure 1:
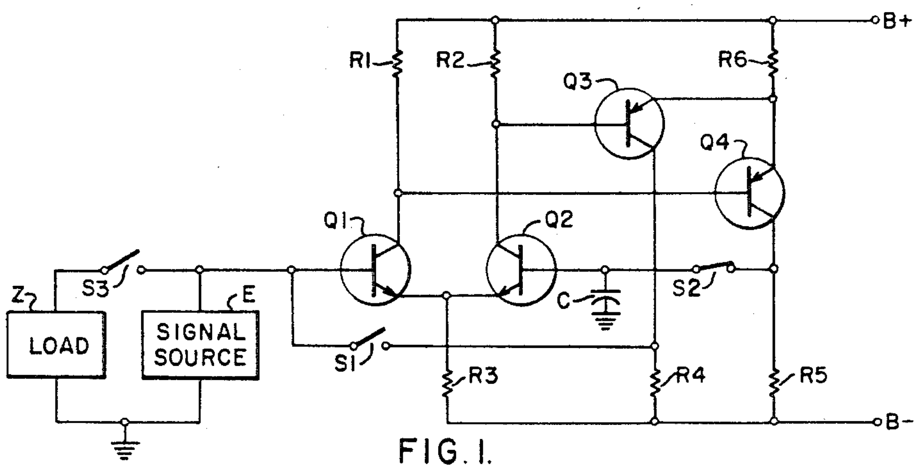
Figure 2:
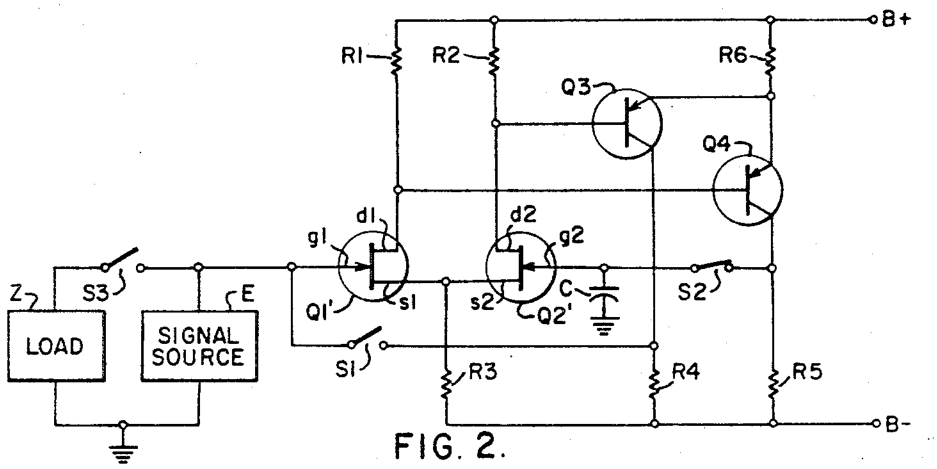

These and other objects and advantages of the present invention will become more apparent when considered in view of the following specification and drawings in which:

FIGURE 1 is a schematic diagram of one embodiment of the storage circuit of the present invention; and FIG. 2 is a second embodiment.

Referring to FIG. 1, a signal source E is provided for establishing the desired storage level of the storage circuit in the storage element thereof which is shown as a capacitor C. The signal source E supplies a unidirectional voltage output $V_s$ to be stored at the same level $V_s$ across the capacitor C. The output $V_s$ of the signal source E is applied as one input to a differential amplifier including a pair of transistors Q1 and Q2. The transistors Q1 and Q2 are shown to be of the NPN type. The input storage level signal $V_s$ is applied between the base of the transistor Q1 and ground. The capacitor C is connected between the base of the transistor Q2 and ground and will acquire the voltage level $V_s$ as will now be explained.

The storage circuit in the state shown on the figure is operative to store the voltage $V_s$ on the capacitor C with a switch S1 in the open condition, a switch S2 in a closed condition and a switch S3 in an open condition. Signal level $V_s$ from the signal source E being applied to the base of the transistor Q1 and, assuming that the voltage across the capacitor C at the base of the transistor Q2 differs from this value, a difference voltage will appear across the collector electrodes of the transistors Q1 and Q2. Resistors R1 and R2 are respectively connected between a B+ line and the collector electrodes of the transistors Q1 and Q2. The emitter electrodes of the transistors Q1 and Q2 are commonly connected, with a resistor R3 being connected between the emitter electrodes thereof and a B— line. A source of positive polarity direct potential, not shown, and a source of negative polarity direct potential, not shown, are applied respectively, to the B+ and B— lines. The transistors Q1 and Q2 being differentially connected, a difference voltage between the signal level appearing at the respective gate electrodes thereof will cause a proportional difference voltage to appear between the collector electrodes thereof, but of opposite polarity.

A second differential amplifier is provided including a pair of transistors Q3 and Q4. The transistors Q3 and Q4 are shown to be of the PNP type. The differential amplifier including the transistors Q3 and Q4 receives as inputs thereto outputs of the differential amplifier including the transistors Q1 and Q2. Accordingly, the collector electrode of the transistor Q1 is connected to the base electrode of the transistor Q4, and the collector electrode of the transistor Q2 is connected to the base electrode of the transistor Q3. The collector electrodes of the transistors Q3 and Q4 are respectively connected through a resistor R4 and a resistor R5 to the B— line. The emitter electrodes of the transistors Q3 and Q4 are commonly connected, with a resistor R6 being connected between the emitter electrodes and the B+ line.

Assume that it is desired to increase the stored potential across the capacitor C in the positive direction. In order to do this the output of the signal source E is increased to the desired level. With the base of the transsistor Q1 being driven in the positive direction by the increased positive voltage applied thereto, the collector electrode thereof is driven in the negative direction. The collector of the transistor Q1 being connected to the base of the transistor Q4 causes the collector of the PNP transistor Q4 to go in the positive direction. This increase in voltage in the positive direction at the collector of the transistor Q4 is coupled through the closed switch S2 to the capacitor C connected to the base of the transistor Q2 and thereby increases the stored potential on the capacitor C. The potential across the capacitor C will increase until it substantially equals the desired input potential applied to the base of the transistor Q1. At the time that the voltages at the base electrodes of the transistors Q1 and Q2 are nearly equal, the potential at the collector electrodes thereof also will be nearly equal so that the differential amplifier including the transistors Q1 and Q2 will supply negligible difference potential between the collector electrodes thereof. The collector electrodes of the transistors Q1 and Q2 being respectively connected to the base electrodes of the transistors Q4 and Q3 will have nearly equal voltages appearing at the collector electrodes thereof. The collector electrode of the transistor Q4 being coupled to the capacitor C through the closed switch S2 thus establishes the capacitor C at the desired voltage to be stored thereacross. The switch S1 which is coupled between the collector electrode of the transistor Q3 and the base electrode of the transistor Q1 is placed in an open state as shown during the charging process of the capacitor C.

In order to store the desired potential across the capacitor C for extended periods of time, the switch S2 between the collector and base electrodes of the transistors Q4 and Q2, respectively, is opened, while the switch S1 is closed to complete a feedback path between the collector of the transistor Q3 and the base of the transistor Q1. The switch S3 which is connected between the signal source E and a load Z is also closed to place the load Z directly across the signal source E. With the switch S2 open the voltage appearing across the capacitor C acts as an independent input voltage to the differential amplifier at the base of the transistor Q2. There being no discharge path for the capacitor C, other than the base electrode of the transistor Q2, this potential will remain substantially constant presuming no circuit disturbances. If some circuit disturbance should occur, however, the storage circuit as shown in FIG. 1 is operative to compensate for this disturbance and maintain the desired charge level at the capacitor C.

Assume for some reason that the base electrode of the transistor Q1 is driven in a negative direction, that is, made slightly less positive. This will cause the collector electrode thereof to go in the positive direction. The collector of the transistor Q2 will however be driven in the negative direction since the transistors Q1 and Q2 are connected in a differential manner with the emitter electrodes commonly connected. The less positive potential from the collector of the transistor Q2 is applied to the base of the transistor Q3 which causes the collector electrode thereof to go in the positive direction. The collector of the transistor Q2 being coupled through the switch S1 to the base of the transistor Q1 will thus cause a more positive voltage to be applied to the base of the transistor Q1 through this feedback loop. Thus, the previously assumed drop in voltage at the base of the transistor Q1 is compensated for by the more positive voltage applied thereto from the collector of the transistor Q3. The increased positive voltage is applied to the base of the transistor Q1 until it is raised and equals the voltage appearing across the capacitor C at the base of the transistor Q2. When this occurs an equilibrium condition is established with the potential on the capacitor C remaining constant at the desired stored level.

In order to insure that equal potentials will exist at the collectors of the transistors Q1 and Q2 and Q3 and Q4 when equal potentials are applied to the base electrodes thereof, it is desirable that matched transistors or dual transistors be utilized to insure substantially identical characteristics.

It is desired to input new information from the signal source E to be stored on the capacitor C, the switches S1 and S3 are opened and the switch S2 is closed. Thus, for example, if a lower level voltage than previously stored is desired to be now stored across the capacitor C, the output of the signal source E is lowered which lowers the potential appearing at the base of the transistor Q1. Accordingly, the collector electrode of the transistor Q1 is driven in the positive direction so that the base of the transistor Q4 is similarly driven. The collector of the transistor Q4 thus is driven in the negative direction so that the base of the transistor Q2 also has applied thereto a less positive potential. The capacitor C which is connected between the base of the transistor Q2 and ground is thus charged to a new potential which is lower than the previously stored potential. The newly stored potential which is equal to the potential from the signal source E supplied to the base of the transistor Q1 may be stored by opening the switch S2, and closing the switches S1 and S3 with the storing operation of the circuit being similar to that previously described.

The desired voltage appearing across the capacitor C may be maintained for long periods of time since the only factors effecting the voltage thereacross are leakage currents through the capacitor C or through the transistor Q2. Leakage current through the capacitor C may be minimized by the selection of a capacitor having a very low leakage current rating. Similiarly, the transistor Q2 should be selected to have a high current gain to minimize the base-emitter current therethrough while still providing adequate operation otherwise.

FIG. 2 shows another embodiment of the present invention in which the junction-type transistors Q1 and Q2 of FIG. 1 have been replaced with field effect transistors Q1′ and Q2′, respectively. The field effect transistor Q2′ is very advantageously used to replace the transistor Q2 of FIG. 1 since field effect transistors have a very high input impedance and minimal leakage current characteristic. By the usage of the field effect transistor Q2′, the leakage current problem of the storage circuit is virtually eliminated. In FIG. 2 the conditions for the field effect transistors Q1′ and Q2′ are respectively similar to the connections for the transistors Q1 and Q2. Thus, the gate electrode *g*1, the drain electrode *d*1 and the source electrode *s*1 of the field effect transistor Q1′ is connected, respectively, as the base, the collector and the emitter electrodes of the transistor Q1 of FIG. 1. Similarly, the gate electrode *g*2, the drain electrode *d*2 and the source electrode *s*2 are connected, respectively, as the base, collector and emitter electrodes of the transistor Q2 of FIG. 1. The field effect transistors Q1′ and Q2′ are connected in a differential amplifier fashion with the source electrode *s*1 of the field effect transistor Q1′ and the source electrode *s*2 of the field effect transistor Q2′ being commonly connected, while the drain electrode *d*1 of the field effect transistor Q1′ is connected to the base electrode of the transistor Q4, and the drain electrode *d*2 of the field effect transistor Q2′ is connected to the base electrode of the transistor Q3. The capacitor C is connected between the gate electrode *g*2 of the field effect transistor Q2′ and ground. The operation of the circuit shown in FIG. 2 is identical to that of FIG. 1 except that the field effect transistor Q2′ presents a very high input impedance to the voltage stored on the capacitor C and thereby minimizes any leakage current through the field effect transistor Q2′ and permits the extended storage of the desired signal level on the capacitor C. Preferably, the field effect transistors Q1′ and Q2′ are matched in order to provide substantially identical characteristics and thereby insure that when equal voltages are applied to the gate electrodes thereof equal voltages will appear at the drain electrodes thereof.

Although the present invention has been described with a certain degree of particularity, it should be understood that the present disclosure has been made only by way of example and that numerous changes in the combination of arrangement of elements and components can be resorted to without departing from the scope and the spirit of the present invention.

We claim as our invention:

1. A storage circuit comprising:

a first differential amplifier;

input means operatively connected to a first input of said first differential amplifier for defining a desired storage level;

storage means operatively connected to a second input of said first differential amplifier;

a second differential amplifier receiving as inputs thereto the differential output of said first differential amplifier; and selection means for connecting a first output of said second differential amplifier to said second input of said first differential amplifier and disconnecting a second output of said second differential amplifier from said first input of said first differential amplifier so that said storage means is established at said desired level, and connecting said second output of said second differential amplifier to said first input of said first differential amplifier and disconnecting said first output of said second differential amplifier from said second input of said first differential amplifier so that said desired storage level is maintained at said storage means.

2. The storage circuit of claim 1 wherein:
said first and second differential amplifiers each include a pair of semiconductor devices differentially connected, and
said storage means includes a capacitive device.

3. The storage circuit of claim 2 wherein:
said semiconductor devices comprise transistors having a plurality of electrodes,
a first-type electrode of each of said transistors acting as an input for the respective differential amplifiers, a second-type electrode of said pair of transistors in each of said differential amplifiers being commonly connected, and a third-type electrode of each of said transistors acting as an output for the respective differential amplifier.

4. The storage circuit of claim 2 wherein:
said semiconductor devices included in said first differential amplifier comprise field effect transistors.

5. The storage circuit of claim 3 wherein:
said selection means includes a first switch connected between the first output of said second differential amplifier and said second input of said first differential amplifier and a second switch connected between the second output of said second differential amplifier and the first input of said first differential amplifier,
said first switch being closed and said second switch being opened to establish said desired storage level at said storage means, and said first switch being opened and said second switch being closed to maintain said desired storage level at said storage means.

6. The storage circuit of claim 3 wherein:
the pair of transistors of said first differential amplifier being of one type and the pair of transistors of said second differential amplifier being of another type.

7. The storage circuit of claim 6 wherein:
said transistors each include base, collector and emitter electrodes, and wherein said base electrodes are connected as said first-type electrodes, said emitter electrodes are connected as said second-type electrodes and said collector electrodes are connected as said third-type electrodes.

References Cited

UNITED STATES PATENTS

| | | | |
|---|---|---|---|
| 3,158,759 | 11/1964 | Jasper | 307—255 X |
| 3,207,998 | 9/1965 | Corney et al. | 328—151 X |
| 3,213,385 | 10/1965 | Sikorra | 330—30 X |
| 3,292,098 | 12/1966 | Bensing | 330—30 X |

ARTHUR GAUSS, Primary Examiner

J. D. FREW, Assistant Examiner

U.S. Cl. X.R.

307—235; 328—151; 330—30, 69